US012681324B2

(12) United States Patent
Zhang et al.

(10) Patent No.: US 12,681,324 B2
(45) Date of Patent: Jul. 14, 2026

(54) IMAGING OPTICAL SYSTEM AND DISPLAY APPARATUS

(71) Applicant: ANHUI EASPEED TECHNOLOGY CO., LTD., Hefei (CN)

(72) Inventors: Liangliang Zhang, Hefei (CN); Junchang Li, Hefei (CN)

(73) Assignee: ANHUI EASPEED TECHNOLOGY CO., LTD., Hefei (CN)

( * ) Notice: Subject to any disclaimer, the term of this patent is extended or adjusted under 35 U.S.C. 154(b) by 293 days.

(21) Appl. No.: 18/533,222

(22) Filed: Dec. 8, 2023

(65) Prior Publication Data

US 2024/0103293 A1     Mar. 28, 2024

Related U.S. Application Data

(63) Continuation of application No. PCT/CN2022/093933, filed on May 19, 2022.

(30) Foreign Application Priority Data

Jun. 9, 2021    (CN) .......................... 202110644041.4

(51) Int. Cl.
   *G02B 30/56*     (2020.01)
   *G09F 19/16*     (2006.01)
   *G09F 19/18*     (2006.01)

(52) U.S. Cl.
   CPC ............. *G02B 30/56* (2020.01); *G09F 19/16* (2013.01); *G09F 19/18* (2013.01)

(58) Field of Classification Search
   CPC .......... G02B 30/56; G09F 19/16; G09F 19/18
   See application file for complete search history.

(56) References Cited

U.S. PATENT DOCUMENTS

| | | |
|---|---|---|
| 2015/0279283 A1 | 10/2015 | Nakao |
| 2017/0017089 A1 | 1/2017 | Kim |
| 2018/0364486 A1 | 12/2018 | Ding et al. |

FOREIGN PATENT DOCUMENTS

| | | |
|---|---|---|
| CN | 101655606 A | 2/2010 |
| CN | 101765798 A | 6/2010 |
| CN | 104777616 A | 7/2015 |
| CN | 106997100 A | 8/2017 |

(Continued)

OTHER PUBLICATIONS

Extended European Search Report from corresponding European Application No. EP22819322.3, dated Sep. 5, 2024.

(Continued)

*Primary Examiner* — Lucy P Chien

(57) ABSTRACT

Provided are an imaging optical system capable of increasing a field of view and a display apparatus. The imaging optical system includes a flat lens and a reflection assembly. The flat lens includes two groups of optical waveguide arrays. The reflection assembly has at least one pair of reflection surfaces. Two reflection surfaces in a same pair are located at an image source side and a viewing side of the flat lens, respectively. An angle between each reflection surface and the flat lens is smaller than or equal to 90 degrees. Angles between each of the two reflection surfaces in the same pair and the flat lens are equal, and intersection lines of each of the two reflection surfaces in the same pair and the flat lens are parallel to each other.

10 Claims, 9 Drawing Sheets

(56) References Cited

FOREIGN PATENT DOCUMENTS

| CN | 107908006 | A |   | 4/2018 |   |   |
|----|-----------|---|---|--------|---|---|
| CN | 110208896 | A |   | 9/2019 |   |   |
| CN | 110488492 | A |   | 11/2019 |   |   |
| CN | 110794495 | A | * | 2/2020 | ............ | G09F 19/16 |
| CN | 211061779 | U |   | 7/2020 |   |   |
| CN | 112099239 | A |   | 12/2020 |   |   |
| CN | 212483906 | U |   | 2/2021 |   |   |
| CN | 113436560 | A |   | 9/2021 |   |   |
| CN | 114326144 | A |   | 4/2022 |   |   |
| GB | 1107547 | A |   | 3/1968 |   |   |
| JP | H11202410 | A |   | 7/1999 |   |   |
| JP | 2001034213 | A |   | 2/2001 |   |   |
| JP | 2013257529 | A |   | 12/2013 |   |   |
| JP | 2015191051 | A |   | 11/2015 |   |   |
| JP | 2017167224 | A |   | 9/2017 |   |   |
| JP | 2019086541 | A | * | 6/2019 |   |   |
| JP | 2019138985 | A |   | 8/2019 |   |   |
| JP | 2019203981 | A |   | 11/2019 |   |   |
| JP | 2020060752 | A |   | 4/2020 |   |   |
| TW | 201701022 | A |   | 1/2017 |   |   |
| WO | WO2017146016 | A1 |   | 8/2017 |   |   |
| WO | 2020227993 | A1 |   | 11/2020 |   |   |

OTHER PUBLICATIONS

First Office Action dated Nov. 12, 2024 received in corresponding patent family application No. JP2023-575986. English Translation attached.

International Search Report dated Aug. 2, 2022 in International Application No. PCT/CN2022/093933. English translation attached.

The Grant Notice from corresponding Chinese Application No. 202110644041.4, dated Aug. 15, 2022. English translation attached.

First Office Action dated Dec. 31, 2024 received in corresponding patent family application No. CN202211366127.6. English translation attached.

Rejection Decision dated Mar. 4, 2025 received in corresponding patent family application No. JP2023-575986. English translation attached.

Grant Notice dated Jul. 25, 2025 received in corresponding patent family application No. CN202211366127.6. English translation attached.

Second Office Action dated May 22, 2025 received in corresponding patent family application No. CN202211366127.6. English translation attached.

* cited by examiner

K

1000

IMAGING OPTICAL SYSTEM AND DISPLAY APPARATUS

CROSS-REFERENCE TO RELATED APPLICATION

This application is a continuation of International Application No. PCT/CN2022/093933, filed on May 19, 2022, which claims priority to Chinese Patent Application No. 2021106440414 (filed on Jun. 9, 2021), the entire contents of which are incorporated herein by reference.

FIELD

The present disclosure relates to the field of optical device manufacturing, and more particularly, to an imaging optical system capable of increasing a field of view and a display apparatus.

BACKGROUND

A flat lens enables light to be totally reflected once in each of two layers of array optical waveguides by using two layers of array optical waveguides that are periodically distributed and are orthogonal with each other. Due to the two layers of array optical waveguides are rectangular structures that are orthogonal with each other, an incident angle during a first total reflection is the same as an exit angle during a second total reflection. All light within a light divergence angle of a light source is correspondingly converged to a spatial position symmetrical to the light source relative to a tangent plane of the flat lens after passing through the flat lens, so as to obtain a floating real image in 1:1. However, some disadvantages exist in the existing imaging structure, such as a small angle of visibility at a viewing side. When deviating from a center axis of the flat lens by a predetermined angle, an audience will not be able to watch the formed real image. This type of flat lens with these characteristics is not suitable for public areas for display purposes, making it particularly important to develop a method for expanding an angle of visibility of the flat lens.

Some of conventional methods for expanding the angle of visibility in the prior art may cause real image deformation, and some are difficult to popularize in the public area due to their complex structures and too high costs. In addition, some structures result in only limited increases in the angle of visibility, rendering them less effective. Therefore, one of the research directions in this field is how to use a simple structure to realize a significant increase in a viewing angle of the flat lens.

SUMMARY

The present disclosure aims to at least solve one of technical problems existing in the prior art. To this end, the present disclosure provides an imaging optical system, which increases an angle of visibility of a flat lens with a simple structure.

Another objective of the present disclosure is to provide a display apparatus having the above-mentioned imaging optical system.

According to embodiments of the present disclosure, the imaging optical system includes a flat lens and a reflection assembly. The flat lens includes two groups of optical waveguide arrays. Each group of optical waveguide arrays is composed of a plurality of rows of sub-waveguides arranged in a single column and each having a rectangular cross section. The two groups of optical waveguide arrays include a first optical waveguide array and a second optical waveguide array. The sub-waveguides in the first optical waveguide array extend in an X direction and are arranged in a plurality of rows in a Y direction. The sub-waveguides in the second optical waveguide array extend in the Y direction and are arranged in a plurality of rows in the X direction. The first optical waveguide array and the second optical waveguide array are arranged in a Z direction. Every two of the X direction, the Y direction, and the Z direction are perpendicular to each other. The flat lens has a center normal line passing through a center of the flat lens and is parallel to the Z direction. Two opposite sides of the flat lens are an image source side and a viewing side, respectively. The reflection assembly has at least one pair of reflection surfaces. Two reflection surfaces in a same pair are located at the image source side and the viewing side, respectively. Each reflection surface is planar and faces towards the center normal line. An angle between each reflection surface and the flat lens is smaller than or equal to 90 degrees. Angles between each of the two reflection surfaces in the same pair and the flat lens are equal, and intersection lines of each of the two reflection surfaces in the same pair and the flat lens are parallel to each other.

With the imaging optical system according to the embodiments of the present disclosure, the reflection surfaces are located at the image source side and the viewing side of the flat lens, respectively, forming paired reflection surfaces. In this way, a field of view can be increased by using the reflection surface. In some solutions, the reflection surface may even expand the field of view to 180 degrees. In this way, when an audience watches a floating real image at the viewing side, more audiences can be accommodated for watching due to the increase of the field of view, which allows the imaging optical system to be applicable in a public area for display purpose, thereby breaking through use limitations of a single flat lens. In addition, by utilizing the reflection surface to reflect light, a utilization rate of light at an edge of the light source can be improved. Moreover, more light is caused to be emitted to the floating real image through the reflection surface. Therefore, it is beneficial to an enhancement in brightness and definition of the floating real image and an improvement in imaging quality.

In some embodiments, an edge of each reflection surface is attached to the flat lens.

In some embodiments, the reflection assembly has a plurality of pairs of reflection surfaces arranged in directions surrounding the central normal line.

In an exemplary embodiment of the present disclosure, two of the plurality of pairs of reflection surfaces are located at two opposite sides of the center normal line; and in the two pairs of reflection surfaces located at the two opposite sides of the center normal line, angles between each of the two pairs of reflection surfaces and the flat lens are equal, and intersection lines of each of the two pairs of reflection surfaces and the flat lens are parallel to each other.

In some embodiments, the two reflection surfaces in the same pair are symmetrically arranged relative to the flat lens.

In some embodiments, the reflection assembly includes at least two reflection mirrors that are plane mirrors; and a surface of each of the at least two reflection mirrors facing towards the center normal line forms the reflection surface.

The display apparatus according to the embodiments of the present disclosure includes the imaging optical system as described according to the above embodiments of the present disclosure and a display. The display is located at the image source side and has a display screen facing towards the flat lens.

With the display apparatus according to the embodiments of the present disclosure, the reflection surfaces in pair are located at each of two sides of the flat lens. In this way, the field of view can be increased by using the reflection surface. In some solutions, the reflection surface can even expand the field of view to 180 degrees. In this way, when the audience watches the floating real image from the viewing side, more audiences can be accommodated for watching due to the increase of the field of view, which allows the display apparatus to be applied to the public area for display purpose, thus overcoming use limitations of the display apparatus. In addition, by utilizing the reflection surface to reflect the light, the utilization rate of the light from the edge of the light source can be improved. Moreover, more light is emitted to the floating real image through the reflection surface. Therefore, it is beneficial to the improvement in the imaging quality.

In some specific embodiments, the display screen is a straight panel screen. An angle between the display screen and the flat lens is an acute angle. The display screen has four edges that are a proximal edge, a distal edge, and two inclined edges, respectively. The proximal edge and the distal edge are two opposite edges of the display screen, and the proximal edge is located at a side edge of the display screen that is close to the flat lens; and at the image source side, two sides of the display screen corresponding to the two inclined edges have reflection surfaces, respectively, and/or a side of the display screen corresponding to the distal edge has a reflection surface.

In some optional embodiments, the reflection surface corresponding to the inclined edge is a first augmented-vision reflection surface; and a projection formed by the display screen in a direction parallel to the flat lens is completely located within the first augmented-vision reflection surface.

In an exemplary embodiment of the present disclosure, the first augmented-vision reflection surface is triangular or trapezoidal; and the projection formed by the display screen in the direction parallel to the flat lens is flush with an edge of the first augmented-vision reflection surface.

Further, the reflection surface corresponding to the distal edge is a second augmented-vision reflection surface; and the second augmented-vision reflection surface is rectangular.

In another exemplary embodiment of the present disclosure, the first augmented-vision reflection surface is triangular; the projection formed by the display screen in the direction parallel to the flat lens is flush with the edge of the first augmented-vision reflection surface; and a projection formed by the second augmented-vision reflection surface in the direction parallel to the flat lens is flush with another edge of the first augmented-vision reflection surface.

Additional aspects and advantages of the present disclosure will be provided in part in the following description, or will become apparent in part from the following description, or can be learned from practicing of the present disclosure.

BRIEF DESCRIPTION OF THE DRAWINGS

The above and/or additional aspects and advantages of the present disclosure will become apparent and understandable from the following description of embodiments in conjunction with the accompanying drawings, in which.

REFERENCE NUMERALS

Figure 1:
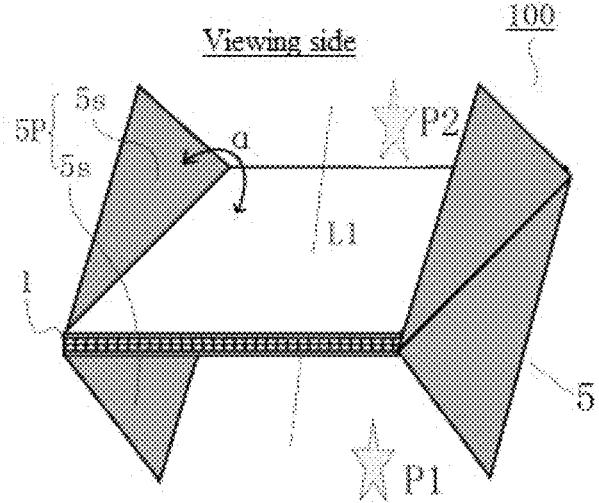
FIG. 1 is a schematic structural view of an imaging optical system according to an embodiment of the present disclosure.

1000, display apparatus
1000A, first display apparatus; 1000B, second display apparatus; 1000C, third display apparatus; 1000D, fourth display apparatus; 1000E, fifth display apparatus
100, imaging optical system 1, flat lens;

10, optical waveguide array; 11, first optical waveguide array; 12, second optical waveguide array;

101, sub-waveguide;

30, protection cover plate; 31, first cover plate; 32, second cover plate;

L1, center normal line;

5, reflection assembly;

50, reflection mirror; 51, plane mirror; 52, prism;

5s, reflection surface; 5s-1, first augmented-vision reflection surface; 5s-2, second augmented-vision reflection surface; 5P;

200, display;

210, display screen; 211, proximal edge; 212, distal edge; 213, inclined edge;

P1, image; P2, floating real image.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

An imaging optical system 100 according to the embodiments of the present disclosure will be described below with reference to the drawings.

As illustrated in FIG. 1, according to the embodiments of the present disclosure, the imaging optical system 100 includes a flat lens 1 and a reflection assembly 5.

Figure 2:
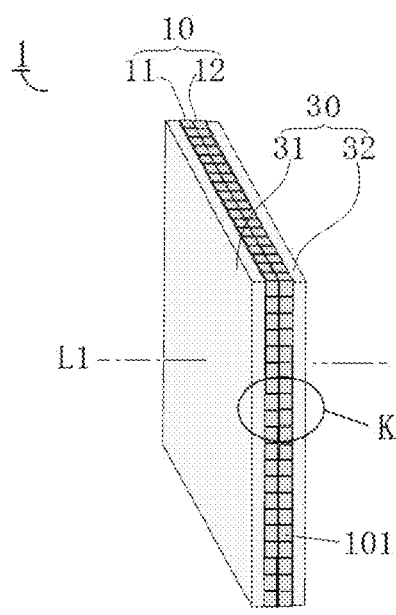
FIG. 2 is a structural general view of a flat lens according to an embodiment of the present disclosure.
Figure 3:
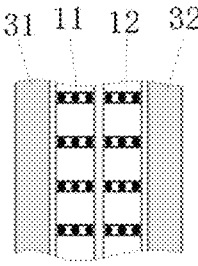
FIG. 3 is a partially enlarged view at K in FIG. 2 in a side-view direction.
Figure 4:
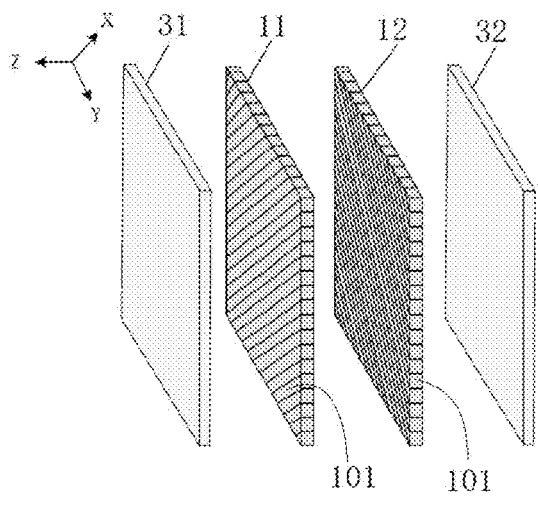
FIG. 4 is an exploded view of a flat lens according to an embodiment of the present disclosure.

Two opposite sides of the flat lens 1 are an image source side and a viewing side, respectively. That is, a light source of an image P1 is located at the image source side. The image P1 may pass through the flat lens 1 to form a floating real image P2 at the viewing side, and the floating real image P2 is a real image floating in the air. As illustrated in FIG. 2 to FIG. 4, the flat lens 1 is an optical structure with two layers of optical waveguide arrays 10 periodically distributed being orthogonal with each other, which enables a total reflection of light once in each of the two layers of optical waveguide arrays 10. Since the two layers of optical waveguide arrays 10 are rectangular structures that are orthogonal with each other, an incident angle of a first total reflection is the same as an exit angle of a second total reflection. All light within a divergence angle of light from a light source can converge to a viewing side correspondingly after passing through the flat lens 1, to obtain a floating real image P2 in 1:1 as a size of the image P1.

It can be understood that a divergence angle of light of the floating real image P2 may be regarded as a field of view of the floating real image P2 at the viewing side. In combination with a characteristic of the image P1 and the floating real image P2 being symmetrical relative to the flat lens 1, an angle of light emitted from a light source of the image P1 to the flat lens 1 is substantially equal to the divergence angle of light of the floating real image P2. Therefore, the greater an area of the flat lens 1, the greater the field of view of the floating real image P2.

In practical application, the area of the flat lens 1 is not likely to be excessively great. As a result, conventional imaging of the flat lens 1 presents a small field of view. For example, a horizontal field of view of some flat lens 1 is about ±30 degrees. When a position of human eye deviates from a range of the field of view, the formed real image cannot be seen. Especially in public areas, only can a small range of audiences directly facing towards the flat lens 1 see a clear real image. Any slight deviation from this position makes it difficult for the audience to see the clear real image.

In order to solve this problem, in the present disclosure, the imaging optical system 100 is provided with the reflection assembly 5. A reflection surface 5s of the reflection assembly 5 is used to cooperate with the flat lens 1 for imaging.

Referring to FIG. 1, the reflection assembly 5 has at least one pair of reflection surfaces 5s. Two reflection surfaces 5s in a same pair are located at the image source side and the viewing side, respectively. In the drawings of the present disclosure, the two reflection surfaces 5s in the same pair that are located at the image source side and the viewing side are labeled as 5P.

Here, the reflection surface 5s is planar and faces towards a center normal line L1 of the flat lens 1, and an angle α between the reflection surface 5s and the flat lens 1 is smaller than or equal to 90 degrees. It should be noted that the flat lens 1 has the center normal line L1. The center normal line L1 is a reference line introduced for describing a structure of the imaging optical system 100 in the present disclosure. The center normal line L1 passes through a center of the flat lens 1. Moreover, the center normal line L1 is parallel to a thickness direction of the flat lens 1. The center of the flat lens 1 refers to a centroid of the flat lens 1.

The reflection surface 5s is located at the image source side. Light emitted from the light source of the image P1 to the reflection surface 5s may be reflected to the flat lens 1. The corresponding reflection surface 5s located at the viewing side allows the light emitted from the flat lens 1 to be reflected to the floating real image P2 through the reflection surface 5s. In this way, the arrangement of the reflection surfaces 5s in the same pair allows light that originally could not reach the flat lens 1 from the light source of the image P1 to be emitted to the flat lens 1 through the reflection surface 5s. As a result, an angle of the light emitted from the light source of the image P1 to the flat lens 1 is increased, and the divergence angle of light of the floating real image P2 is also increased. Therefore, compared with a solution where a reflection assembly 5 is not provided, the field of view of the imaging optical system 100 can be increased by providing the reflection assembly 5.

Here, the reflection surface 5s is planar, which can avoid deformation of the floating real image P2. Angles α between each of the two reflection surfaces 5s in the same pair and the flat lens 1 are equal, and intersection lines of each of the two reflection surfaces 5s in the same pair and the flat lens 1 are parallel to each other. In this way, light reflection paths of the two reflection surfaces 5s in the same pair are symmetrical relative to the flat lens 1, thereby further avoiding the deformation of the floating real image P2. It should be noted that, when the reflection surface 5s is in contact with the flat lens 1, an intersection line of the reflection surface 5s and the flat lens 1 is a contact line between the reflection surface 5s and the flat lens 1. When the reflection surface 5s is not in contact with the flat lens 1, the intersection line of the reflection surface 5s and the flat lens 1 refers to an intersection line of the reflection surface 5s and the flat lens 1 in an extending direction.

The angle α between the reflection surface 5s and the flat lens 1 is smaller than or equal to 90 degrees, which is beneficial to controlling a size of the imaging optical system 100 within a reasonable range. Moreover, it can be understood that, when the angle α between the reflection surface 5s and the flat lens 1 is greater than 90 degrees, compared with a solution where the reflection surface 5s and the flat lens 1 are perpendicular to each other, the reflection surface 5s is in an open state. The open reflection surface 5s reflects a part of light towards a direction facing away from the flat lens 1, and the part of light becomes ineffective light. Therefore, in order to improve an effective utilization rate of light, the solution of the present disclosure sets the angle α between the reflection surface 5s and the flat lens 1 to be smaller than or equal to 90 degrees.

It can also be seen herein that, by controlling the size of the angle α between the reflection surface 5s and the flat lens 1, the purpose of adjusting an angle of an imaging field of view can be achieved.

With the imaging optical system 100 according to the embodiments of the present disclosure, the reflection surfaces 5s are located at the image source side and the viewing side of the flat lens 1, respectively. Moreover, the reflection surfaces 5s are arranged in pairs. In this way, the field of view can be increased by using the reflection surface 5s. In some solutions, the reflection surface 5s can even expand the field of view to 180 degrees. In this way, when the audience watches the floating real image P2 at the viewing side, more audiences can be accommodated for watching due to the increase of the field of view, which allows the imaging optical system 100 to be applicable in a public area for display purpose, thereby breaking through use limitations of a single flat lens 1. In addition, by utilizing the reflection surface 5s to reflect light, a utilization rate of light from an edge of the light source can be improved, and more light is caused to be emitted to the floating real image P2 through the reflection surface 5s. In this way, it is beneficial to an enhancement in brightness and definition of the floating real image P2 and an improvement in imaging quality.

In order to deepen the understanding for the technical solutions of the present disclosure, a basic structure and imaging principle of the flat lens 1 are described below in combination with FIG. 2 to FIG. 9.

Referring to FIG. 2 to FIG. 4, the flat lens 1 includes two groups of optical waveguide arrays 10. Each group of optical waveguide arrays 10 is composed of a plurality of rows of sub-waveguides 101 arranged in a single column, and each sub-waveguide 101 has a rectangular cross section. The cross section of the sub-waveguide 101 herein refers to a section of the sub-waveguide 101 in a direction perpendicular to a length direction of the sub-waveguide 101.

Figure 5:
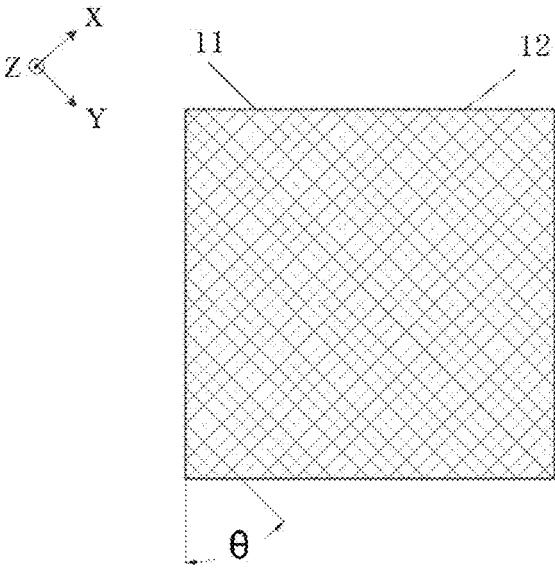
FIG. 5 is a schematic structural view of two layers of orthogonal optical waveguide arrays in a Z direction according to an embodiment of the present disclosure.

Referring to FIG. 3 to FIG. 5, the two groups of optical waveguide arrays 10 include a first optical waveguide array 11 and a second optical waveguide array 12. Sub-waveguides 101 of the first optical waveguide array 11 extend in an X direction and are arranged in a plurality of rows in a Y direction. Sub-waveguides 101 of the second optical waveguide array 12 extend in the Y direction and are arranged in a plurality of rows in the X direction. The first optical waveguide array 11 and the second optical waveguide array 12 are arranged in a Z direction. Every two of the X direction, the Y direction, and the Z direction are perpendicular to each other. An extending direction of the sub-waveguide 101 is the length direction of the sub-waveguide 101. A length direction of a single sub-waveguide 101 of the first optical waveguide array 11 is the X direction. A plurality of sub-waveguides 101 of the first optical wvave-guide array 11 are tightly attached and laminated to each other in the Y direction, and a width direction of the single sub-waveguide 101 is the Y direction. A length direction of a single sub-waveguide 101 of the second optical waveguide array 12 is the Y direction. A plurality of sub-waveguides 101 of the second optical waveguide array 12 are tightly attached and laminated to each other in the X direction, and a width direction of the single sub-waveguide 101 is the X direction. The two groups of optical waveguide arrays 10 are in a shape of a flat plane. An arrangement direction of the first optical waveguide array 11 to the second optical waveguide array 12 is the Z direction, which is also the thickness direction of the flat lens 1. It should be noted that in the first optical waveguide array 11 and the second optical waveguide array 12, the first optical waveguide array 11 or the second optical waveguide array 12 may be arranged close to the image source side, which is not limited herein. The length directions of two layers of sub-waveguides 101 are perpendicular to each other. Therefore, the two layers of optical waveguide arrays 10 are described as being orthogonal with each other.

In another exemplary embodiment of the present disclosure, a reflection film for totally reflecting light is provided on each of two side surfaces of each sub-waveguide 101 in a width direction. For example, the reflection film is provided on each of two side surfaces of the sub-waveguide 101 of the first optical waveguide array 11 in the Y direction. Since the first optical waveguide array 11 includes a plurality of sub-waveguides 101, a plurality of reflection films is arranged in the first optical waveguide array 11 in the Y direction. The reflection film is provided on each of two side surfaces of the sub-waveguide 101 of the second optical waveguide array 12 in the X direction. Since the second optical waveguide array 12 includes a plurality of sub-waveguides 101, a plurality of reflection films is arranged in the second optical waveguide array 12 in the X direction.

In an embodiment, as illustrated in FIG. 2 and FIG. 4, the flat lens 1 may further include a protection cover plate 30. The protection cover plate 30 is configured to support and protect the optical waveguide array 10. The protection cover plate 30 may only be disposed at a side of the flat lens 1, or disposed at both sides of the flat lens 1. In an exemplary embodiment of the present disclosure, the protection cover plate 30 is a transparent cover plate. In another exemplary embodiment of the present disclosure, the protection cover plate is a glass plate.

FIG. 2 to FIG. 4 are schematic structural views of a flat lens 1 according to an embodiment. The flat lens 1 includes a pair of protection cover plates 30, which are a first cover plate 31 and a second cover plate 32, respectively. The flat lens 1 also include two groups of optical waveguide arrays 10 located between the two protection cover plates 30, and the two groups of optical waveguide arrays 10 are the first optical waveguide array 11 and the second optical waveguide array 12, respectively. The X direction is extending directions of the sub-waveguides 101 in the first optical waveguide array 11. The Y direction is extending direction of the sub-waveguides 101 in the second optical waveguide array 12. The Z direction is the thickness direction of the flat lens 1. In other embodiments of the present disclosure, the protection cover plate 30 may be omitted in some solutions, and the optical waveguide array 10 may be protected in other manners.

In another exemplary embodiment of the present disclosure, as illustrated in FIG. 5, an outer contour of a formed optical waveguide array 10 is rectangular, and an angle θ between the extending direction of each sub-waveguide 101 and at least two edges of the outer contour of the optical waveguide array 10 optionally satisfies: 30°≤θ≤60°. Preferably, θ=45°. At this angle, the floating real image P2 is clear, and the residual image is inconspicuous.

Figure 6:
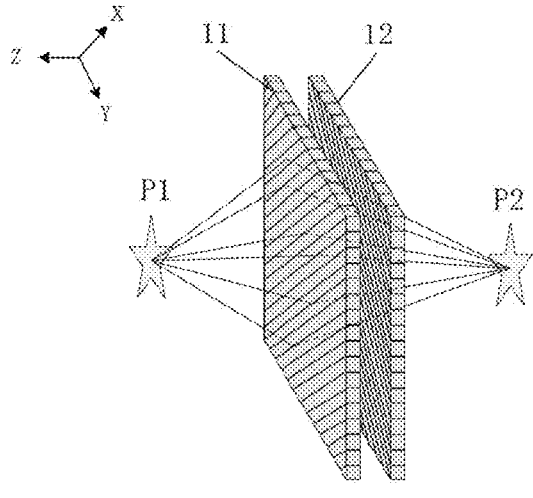
FIG. 6 is a schematic view of imaging of two layers of orthogonal optical waveguide arrays according to an embodiment of the present disclosure.

Here, a core imaging element of the flat lens 1 is the first optical waveguide array 11 and the second optical waveguide array 12. The first optical waveguide array 11 and the second optical waveguide array 12 include a plurality of rows of sub-waveguides 101 arranged in a single column that are orthogonal with each other. The flat lens 1 is flat overall. As illustrated in FIG. 6, the flat lens 1 may implement point-to-point aberration-free imaging for the image P1.

Figure 7:
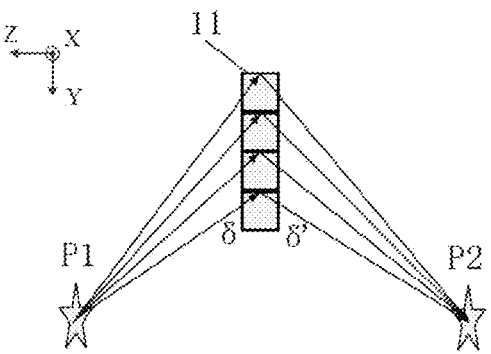
FIG. 7 is a schematic view of imaging of a light source image passing through a single-layer optical waveguide array in an X direction according to an embodiment of the present disclosure.
Figure 8:
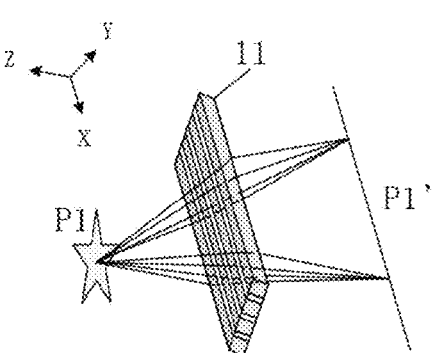
FIG. 8 is a schematic view of imaging of the light source image shown in FIG. 7 passing through a single-layer optical waveguide array in a three-dimensional direction.

The specific imaging principle is as follows: two optical waveguide arrays 10 are split. As illustrated in FIG. 7 and FIG. 8, the first optical waveguide array 11 serves as an example. In the single-layer optical waveguide array 10, after passing through a single-side optical waveguide array 10, single-point light at the image source side is divided by the sub-waveguide 101 in each row for mirror modulation, and re-converged on a straight line P1' parallel to the X direction to form a point-to-line one-dimensional imaging effect. FIG. 7 shows that an incident angle δ of the single-point light at the image source side being incident on a certain sub-waveguide 101 and an exit angle δ' thereof after being reflected by the sub-waveguide 101, the incident angle δ being equal to the exit angle δ'.

Figure 9:
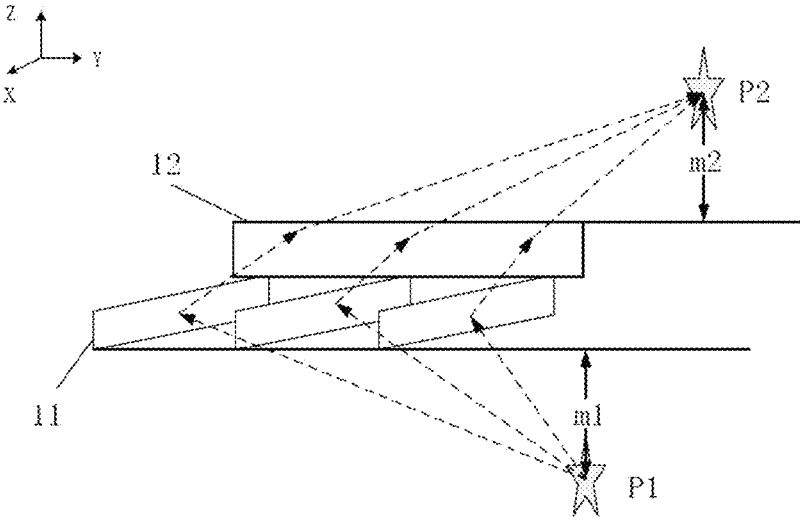
FIG. 9 is a principle diagram of an imaging optical path of a light source image passing through two layers of orthogonal optical waveguide arrays according to an embodiment of the present disclosure.

As illustrated in FIG. 9, in order to achieve two directions (the X direction and the Y direction) intersecting at a point, the two groups of optical waveguide arrays 10 are required to be used in combination, enabling arrangement directions of the two layers of sub-waveguides 101 to be perpendicular to each other, which may perform point-to-point modulation on a target light source image P1. Therefore, light in any direction passes through the double layers of optical waveguide arrays 10 that are orthogonal to each other, which may realize the floating real image P2 that is re-converged at a symmetrical position relative to the optical waveguide array 10. An imaging distance m2 of the floating real image P2 is the same as an original imaging distance m1, which is an equidistant imaging. The floating real image P2 is located in the air without requiring carriers such as projection screen. The real image may be presented in the air.

Therefore, the flat lens 1 may make a two-dimensional light source or a three-dimensional light source directly form the real image in the air and realize a real holographic image. It can achieve a naked-eye three-dimensional stereoscopic display characteristic while a large field of view, a large aperture, high image resolution, no distortion and no dispersion are realized.

In the drawings of the present disclosure, the flat lens 1 is rectangular. However, in other solutions of the present disclosure, the flat lens 1 may also be adjusted as other shapes such as circle, and trapezoid, which is not limited herein.

In some embodiments, as illustrated in FIG. 1, the two reflection surfaces 5s in the same pair are in a symmetrical relationship relative to the flat lens 1, such that the two reflection surfaces 5s in the same pair have a same shape and area. In this way, the area of the reflection surface 5s can be fully utilized, thereby reducing light loss.

In an exemplary embodiment of the present disclosure, the two reflection surfaces 5s in the same pair form an intersection line with the flat lens 1, respectively. The two intersection lines are not only parallel to each other, but a plane formed by the two intersection lines is also perpendicular to the flat lens 1. Thus, misalignment of image splicing can be avoided.

In some embodiments, an edge of the reflection surface 5s is attached to the flat lens 1. It can be understood that when a gap occurs between the reflection surface 5s and the flat lens 1, a corresponding part of the floating real image P2 on a connection line of a human eye and the gap is missing when viewed from a predetermined enlarged viewing angle range, i.e., the floating real image P2 may not be seen within the viewing angle range. However, when an edge of the reflection surface 5s is attached to the flat lens 1, the gap is filled, such that the viewing angle range can be effectively expanded.

In an exemplary embodiment of the present disclosure, in all the reflection surfaces 5s, an edge of each reflection surface 5s is attached to the flat lens 1. In this way, gaps at all the reflection surfaces 5s are filled, so that the viewing angle range can be further effectively expanded.

In the solution of the present disclosure, one pair or two or three pairs of reflection surfaces 5s of the reflection assembly 5 may be provided, and even more pairs of reflection surfaces 5s may be provided according to the requirements of the flat lens 1 and the display 200, which is not limited herein.

When the reflection assembly 5 has a plurality of pairs of reflection surfaces 5s, the plurality of pairs of reflection surfaces 5s are arranged in directions surrounding the central normal line L1, i.e., the plurality of reflection surfaces 5s at the image source side surrounds the central normal line L1, the plurality of reflection surfaces 5s at the viewing side also surrounds the central normal line L1. This arrangement allows a region directly facing towards the center of the flat lens 1 to be vacant for placing the image P1 of the light source. For example, a display screen 210 of the display 200 is caused to directly face towards the center of the flat lens 1.

In an embodiment, as illustrated in FIG. 10 to FIG. 13, two pairs of reflection surfaces 5s are located at two opposite sides of the center normal line L1. In the two pairs of reflection surfaces 5s located at the two opposite sides of the central normal line L1, angles α between each of the two pairs of reflection surfaces 5s and the flat lens 1 are equal, and intersection lines of each of the two pairs of reflection surfaces 5s and the flat lens 1 are parallel to each other. In this way, it facilitates widening a field of view of the imaging optical system 100 in a direction where the two pairs of reflection surfaces 5s are located. Moreover, the two pairs of reflection surfaces 5s may complement each other. The light is continuously reflected between the two pairs of reflection surfaces 5s, allowing the field of view of the imaging optical system 100 in this direction to be almost expanded to 180 degrees.

In such an imaging optical system 100, when the two pairs of reflection surfaces 5s are located at two horizontal sides of the flat lens 1, a horizontal field of view of the imaging optical system 100 can be expanded. Therefore, more audiences can be accommodated for watching simultaneously when the imaging optical system 100 is used in public areas.

In an embodiment, as illustrated in FIG. 14 to FIG. 19, the imaging optical system 100 includes a pair of reflection surfaces 5s that are located at a side of the flat lens 1. In this way, a field of view of the audience at another side of the flat lens 1 can be expanded by using the reflection of the reflection surface 5s.

Figure 20:
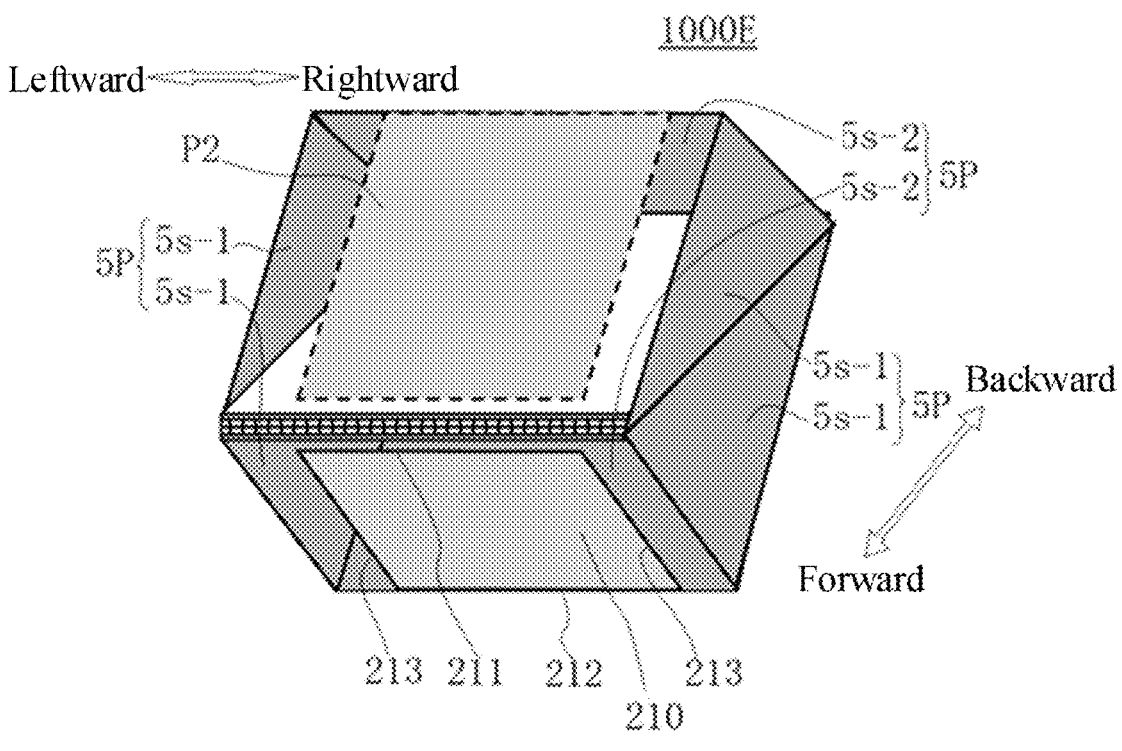
FIG. 20 is a schematic structural view of a fifth display apparatus in Embodiment 5 of the present disclosure.

In another embodiment, as illustrated in FIG. 20, the imaging optical system 100 includes three pairs of reflection surfaces 5s. The three pairs of reflection surfaces 5s are located at three sides of the flat lens 1.

The imaging optical system 100 even includes four pairs of reflection surfaces 5s that are located at four sides of the flat lens 1. Even when the flat lens 1 is a polygon (having at least five edges), the imaging optical system 100 may include more pairs of reflection surfaces 5s.

Figure 10:
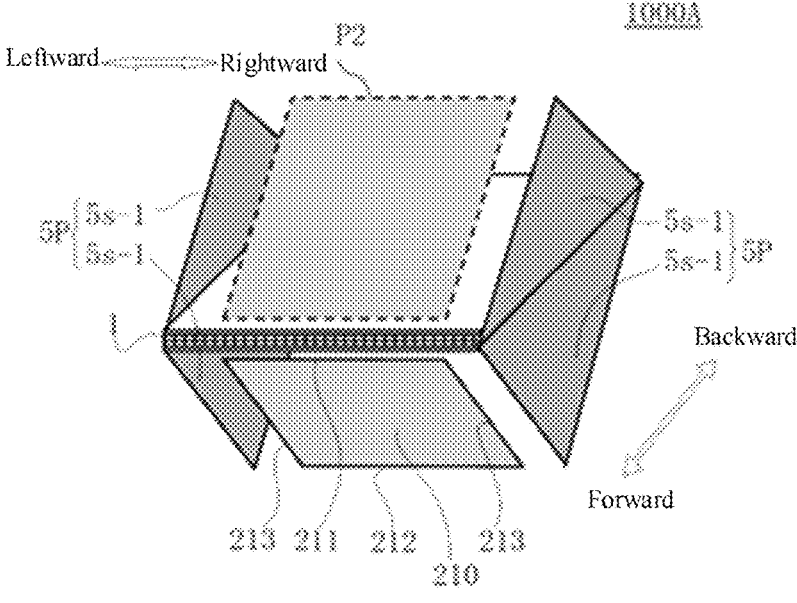
FIG. 10 is a schematic structural view of a first display apparatus in Embodiment 1 of the present disclosure.
Figure 11:
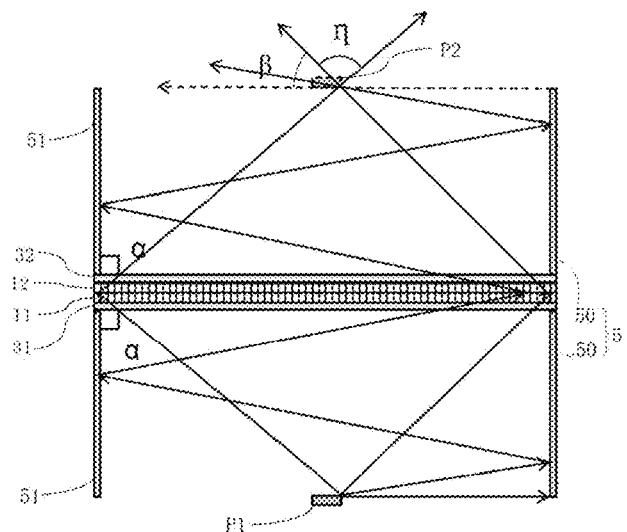
FIG. 11 is a schematic principle diagram of expanding a horizontal field of view of a first display apparatus in Embodiment 1 of the present disclosure.

In the solution of the present disclosure, as illustrated in FIG. 10 and FIG. 11, the reflection assembly 5 includes a reflection mirror 50. The reflection mirror 50 has the reflection surface 5s at its the surface. A shape of the reflection mirror 50 may be arranged as desired. In a solution, the reflection mirror 50 is a plane mirror 51, as illustrated in FIG. 11. In other solutions, the reflection mirror 50 is in other shapes. For example, in FIG. 22, the reflection mirror 50 is a prism 52, with two of its edge planes forming the reflection surfaces 5s.

In embodiments illustrated in FIG. 10 to FIG. 21, the reflection assembly 5 includes at least two reflection mirrors 50. Each reflection mirror 50 is a plane mirror 51. A surface of each reflection mirror 50 facing towards the center normal line L1 forms the reflection surface 5s. The reflection surface 5s is constructed by the plane mirror 51. In this way, not only the structure is simple, but also a shape of the plane mirror 51 is basically the same as the shape of the reflecting surface 5s. In addition, a thickness of the plane mirror 51 may be thinner, which is advantageous to a reduction in a weight.

In summary, with the imaging optical system 100 according to the embodiments of the present disclosure, by providing the reflection surfaces 5s in pairs, the most direct effect is causing a field of view of the floating real image P2 in at least one direction to be expanded, and even to be expanded to 180° in some solutions.

The arrangement of the reflection surface 5s may make full use of the light to cause light that would originally not reach the flat lens 1 to be irradiated onto the flat lens 1 after reflection. In this way, the light can be converged through the flat lens 1 for imaging. Therefore, the utilization rate of light is improved, and the brightness of the floating real image P2 is increased.

It is very simple to provide the reflection surface 5s with this solution of utilizing the reflection surface 5s in the present disclosure. Moreover, by optimizing the size and shape of the reflection surface 5s and the angle α between the reflection surface 5s and the flat lens 1, a volume of the imaging optical system 100 can be fully reduced. The reflection surface 5s has a low arrangement cost and can be produced at scale.

A structure of a display apparatus 1000 according to the embodiments of the present disclosure is described below with reference to the accompanying drawings.

Figure 22:
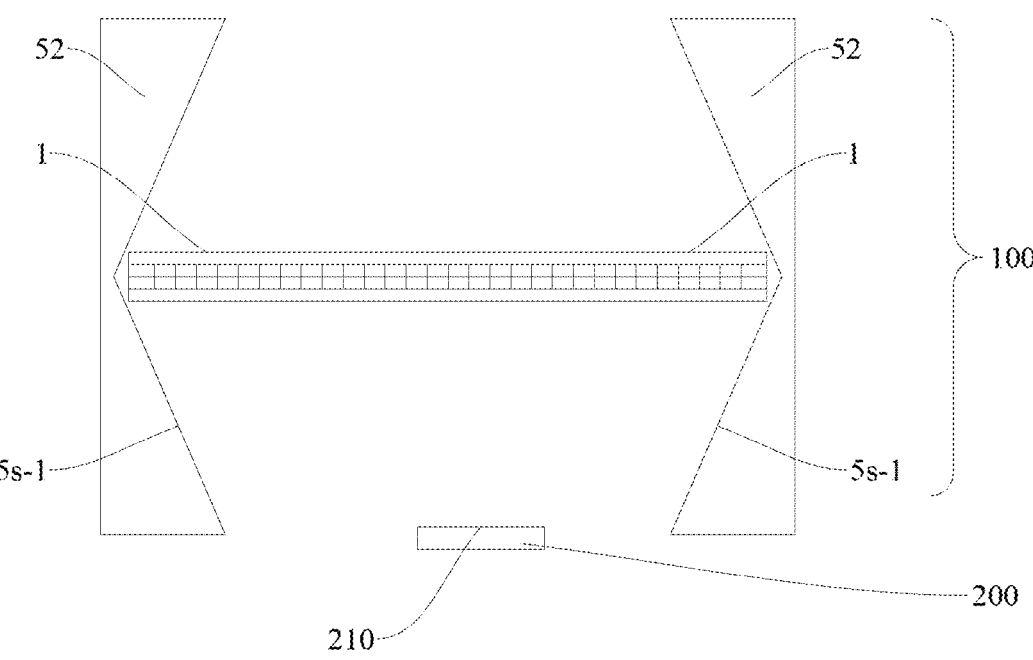
FIG. 22 is a schematic structural view of a display apparatus according to another embodiment of the present disclosure.

As illustrated in FIG. 22, the display apparatus 1000 according to the embodiments of the present disclosure includes: the imaging optical system 100 described according to the above embodiments of the present disclosure and a display 200 (as illustrated in FIG. 22). The imaging optical system 100 may adopt the structure of the imaging optical system 100 described in the above embodiments, and some of the repeated content herein are omitted herein. The display 200 is located at the image source side and has a display screen 210 facing toward the flat lens 1. In this way, after imaging on the display screen 210, light emitted from the display screen 210 passes through the flat lens 1 to present a floating real image P2 in 1:1 as the size of the image P1 at the viewing side.

Figure 12:
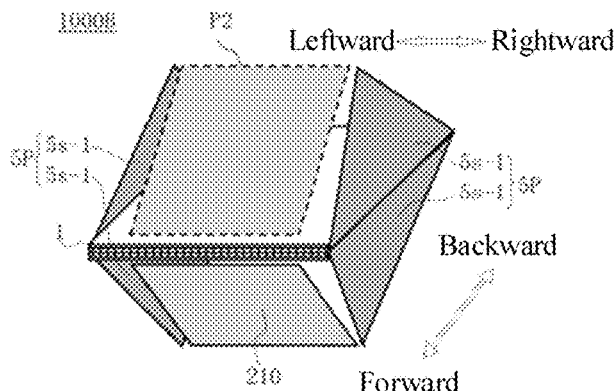
FIG. 12 is a schematic structural view of a second display apparatus in Embodiment 2 of the present disclosure.
Figure 13:
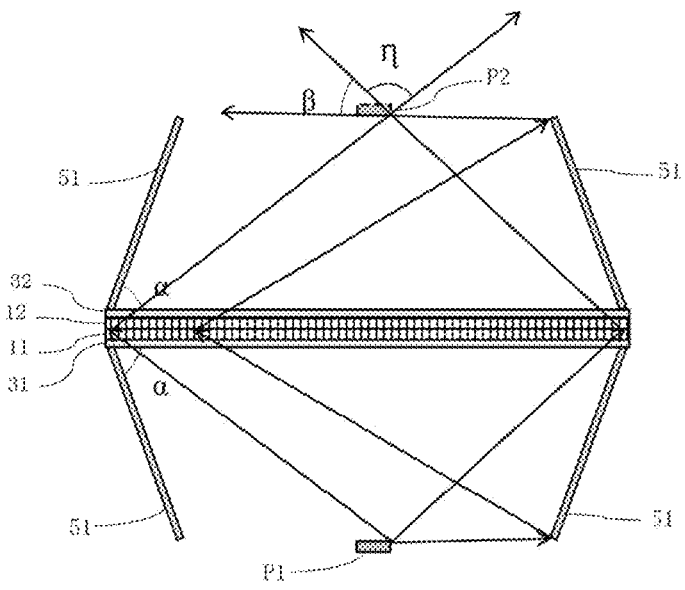
FIG. 13 is a schematic principle diagram of expanding a horizontal field of view of a second display apparatus in Embodiment 2 of the present disclosure.

It should be noted that, FIG. 10 to FIG. 21 illustrate schematic structural views and schematic principle diagrams of the display apparatus 1000 in various embodiments. In some schematic principle diagrams of the embodiments, as illustrated in FIG. 11 and FIG. 13, since the light is overlapped with the image P1 and the floating real image P2 of the display screen 210, only the image P1 and the corresponding floating real image P2 are partially intercepted in the schematic diagrams.

By locating the reflection surfaces 5s in pairs at two sides of the flat lens 1, the field of view can be increased by using the reflection surface 5s. In some solutions, the reflection surface 5s can even expand the field of view to 180 degrees. In this way, when the audience watches the floating real image P2 at the viewing side, more audience can be accommodated for watching due to the increase of the field of view. Therefore, the display apparatus 1000 can be applied in the public area for display purpose, thereby breaking through its use limitations. In addition, by utilizing the reflection surface 5s to reflect the light, the utilization rate of the light at the edge of the light source can be improved. Moreover, more light is caused to be emitted to the floating real image P2 through the reflection surface 5s, which is beneficial to the improvement in the imaging quality.

In some specific embodiments, the display screen 210 is a straight panel screen. An angle λ between the display screen 210 and the flat lens 1 is an acute angle. It can be understood that when the light enters in the thickness direction of the flat lens 1, the light is easy to directly pass through the flat lens 1, and a number of light undergoing total reflection substantially decreases. However, by forming the angle λ between the display screen 210 and the flat lens 1, it is beneficial to formation of a predetermined angle between the light and reflection portions at two sides of the sub-waveguide 101 in the width direction of the sub-waveguide 101 (a reflection portion formed by utilizing the reflection film) when most of the light emitted from the display screen 210 to the flat lens 1. In this way, most of the light can be emitted to the viewing side through total reflection, thereby improving the utilization rate of light.

In an exemplary embodiment of the present disclosure, the display screen 210 has four edges that are a proximal edge 211, a distal edge 212, and two inclined edges 213, respectively. The proximal edge 211 and the distal edge 212 are two opposite edges of the display screen 210, and the proximal edge 211 is located at a side edge of the display screen 210 that is close to the flat lens 1.

At this time, one side, or two or three sides of the display screen 210 may have the reflection surface 5s. In an exemplary embodiment of the present disclosure, at the image source side, two sides of the display screen 210 corresponding to the two inclined edges 213 have reflection surfaces 5s, respectively, or a side of the display screen 210 corresponding to the distal edge 212 has a reflection surface 5s, or two sides of the display screen 210 corresponding to the two inclined edges 213 and a side of the display screen 210 corresponding to the distal edge 212 each have reflection surfaces 5s. In this way, by using the reflection surfaces 5s, field of views of the display screen 210 in one direction or in two directions can be increased.

In the embodiments of the imaging optical system 100 as described above, the reflection surface 5s may have various arrangement forms. Similarly, the reflection surface 5s in the display apparatus 1000 may also have various arrangement forms.

For example, in some optional embodiments, as illustrated in FIG. 10 to FIG. 13, the reflection surface 5s corresponding to the inclined edge 213 is a first augmented-vision reflection surface 5s-1. When the display apparatus 1000 has the first augmented-vision reflection surface 5s-1, two first augmented-vision reflection surfaces 5s-1 are usually provided. The two first augmented-vision reflection surfaces 5s-1 are located corresponding to the inclined edges 213 of the display screen 210, respectively. In this way, the two first augmented-vision reflection surfaces 5s-1 and the flat lens 1 may non-interfere with each other and cooperate with each other, to increase a field of view in a direction where the two first augmented-vision reflection surfaces 5s-1 are located.

In an exemplary embodiment of the present disclosure, a projection formed by the display screen 210 in a direction parallel to the flat lens 1 is completely located within the first augmented-vision reflection surface 5s-1. It should be noted that an objective of introducing the mathematical term "projection" herein is to describe the shape of the reflection surface 5s more clearly. "The projection formed by the display screen 210 in the direction parallel to the flat lens 1" here refers to a graphic obtained on the first augmented-vision reflection surface 5s-1 when a projection line parallel to the flat lens 1 is projected to the first augmented-vision reflection surface 5s-1 through the display screen 210. The projections mentioned below are also defined herein to obtain corresponding graphics.

By completely locating the projection formed by the display screen 210 in the direction parallel to the flat lens 1 in the first augmented-vision reflection surface 5s-1, when a divergence angle of a light source of the display screen 210 approaches 180 degrees, most of light in a range of 180 degrees in the direction where the two first augmented-vision reflection surfaces 5s-1 are located can be emitted to the flat lens 1 and the two first augmented-vision reflection surfaces 5s-1. In this way, the light of the floating real image P2 at the viewing side can be diverged within a 180-degree range, such that the field of view in the direction where the two first augmented-vision reflection surfaces 5s-1 are located is generally 180 degrees. Therefore, a waste of light can be reduced, and the brightness of the floating real image P2 can be improved.

In an exemplary embodiment of the present disclosure, the first augmented-vision reflection surface 5s-1 is triangular or trapezoidal, and the projection formed by the display screen 210 in the direction parallel to the flat lens 1 is flush with an edge of the first augmented-vision reflection surface 5s-1. In another exemplary embodiment of the present disclosure, when the first augmented-vision reflection surface 5s-1 is trapezoidal, a right-angled trapezoid may be selected.

It can be understood that the divergence angle of the light source of the display screen 210 is difficult to exceed 180 degrees. Therefore, the first augmented-vision reflection surface 5s-1 is substantially free of light at a part of the first augmented-vision reflection surface 5s-1 beyond the display screen 210.

Moreover, even if the divergence angle of the display screen 210 exceeds 180 degrees, during light with an angle exceeding 180 degrees being reflected by the reflection surface 5s, a part of the light is reflected in the direction facing away from the flat lens 1, and another part of the light is blocked by the back of the display screen 210, which is actually invalid. In addition, the part of the first augmented-vision reflection surface 5s-1 beyond the display screen 210 is still wasted.

Therefore, the projection formed by the display screen 210 in the direction parallel to the flat lens 1 is flush with an edge of the first augmented-vision reflection surface 5s-1. In this way, a useless area of the first augmented-vision reflection surface 5s-1 can be reduced.

In some optional embodiments, as illustrated in FIG. 14 to FIG. 19, the reflection surface 5s corresponding to the distal edge 212 is the second augmented-vision reflection surface 5s-2. When the display apparatus 1000 has the second augmented-vision reflection surface 5s-2, one second augmented-vision reflection surface 5s-2 is generally provided and located corresponding to the distal edge 212 of the flat lens 1. Since a distance between the proximal edge 211 of the display screen 210 and the flat lens 1 is small, a space for accommodating the reflection surface 5s can be limited. Therefore, the second augmented-vision reflection surface 5s-2 is only suitable for being located corresponding to the distal edge 212 of the display screen 210.

When the second augmented-vision reflection surface 5s-2 is provided, the second augmented-vision reflection surface 5s-2 is rectangular. Since the second augmented-vision reflection surface 5s-2 is substantially opposite to the display screen 210, without any obstruction from other objects, when the divergence angle of the light source of the display screen 210 approaches 180 degrees, an entire area of the second augmented-vision reflection surface 5s-2 can effectively reflect light. At this time, by configuring the second augmented-vision reflection surface 5s-2 to be rectangular, light loss can be reduced. Moreover, the rectangular second augmented-vision reflection surface 5s-2 is not only easy to process, but is also very convenient to install and fix.

Figure 21:
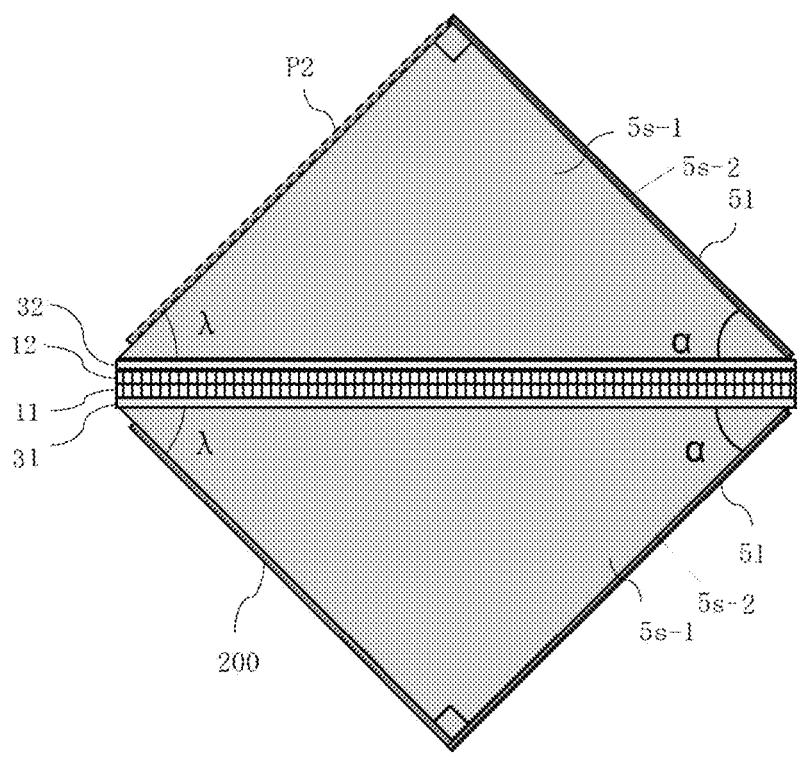
FIG. 21 is a side view of a fifth display apparatus in Embodiment 5 of the present disclosure.

In some optional embodiments, as illustrated in FIG. 20 and FIG. 21, the two inclined edges 213 of the display screen 210 correspondingly have the first augmented-vision reflection surface 5s-1, respectively. The distal edge 212 of the display screen 210 correspondingly has the second augmented-vision reflection surface 5s-2. The first augmented-vision reflection surface 5s-1 is triangular. The projection formed by the display screen 210 in the direction parallel to the flat lens 1 is flush with an edge of the first augmented-vision reflection surface 5s-1. A projection formed by the second augmented-vision reflection surface 5s-2 in the direction parallel to the flat lens 1 is flush with another edge of the first augmented-vision reflection surface 5s-1. In this way, the two first augmented-vision reflection surfaces 5s-1 and the one second augmented-vision reflection surface 5s-2 can be provided on three sides of the inclined display screen 210, thereby reflecting the light to the flat lens 1 as much as possible. Therefore, not only does this increase the field of views in the two directions, but it also improves the utilization rate of light to the maximum, consequently enhancing the brightness of the floating real image P2.

With reference to the drawings illustrated in the specific embodiments, a possible arrangement form of the reflection surface 5s when the display screen 210 is the straight panel screen is described Embodiment 1

FIG. 10 and FIG. 11 show a structural sketch of a display apparatus 1000 and a schematic principle diagram for expanding a horizontal field of view in Embodiment 1, and the display apparatus 1000 is a first display apparatus 1000A.

The first display apparatus 1000A includes a display 200, four reflection mirrors 50, and a flat lens 1.

The display 200 is a flat panel display with a divergence angle of the light source approaching 180 degrees. In order to improve the imaging quality of the floating real image P2, the angle λ between the display screen 210 of the display 200 and the flat lens 1 is chosen to be 45°. The four reflection mirrors 50 are divided into two pairs. Two reflection mirrors 50 in the same pair are located at the image source side and the viewing side, respectively. The surface of each reflection mirror 50 facing towards the center normal line L1 of the flat lens 1 forms its reflection surface 5s. In Embodiment 1, the four reflection surfaces 5s are each the first augmented-vision reflection surfaces 5s-1. Two first augmented-vision reflection surfaces 5s-1 at the image source side are located at left and right sides of the flat lens 1. Two first augmented-vision reflection surfaces 5s-1 at the viewing side are located at the left and right sides of the flat lens 1.

The two reflection mirrors 50 in the same pair are equal in size and are symmetrical to each other relative to the flat lens 1. The two reflection mirrors 50 at the image source side are symmetrical about the central normal line L1, and the two reflection mirrors 50 at the viewing side are symmetrical about the central normal line L1, so as to avoid misalignment of the image splicing. It is assumed that the flat lens 1 is horizontally placed, the two groups of reflection mirrors 50 are each vertically placed.

As mentioned above, the first augmented-vision reflection surface 5s-1 may be in a shape of a right-angled trapezoid or a triangle. The first augmented-vision reflection surface 5s-1 in the first display apparatus 1000 A selects the triangular shape. In this way, a size of each of consumables and the entire apparatus can be reduced to the maximum.

Two triangular reflection mirrors 50 in each pair have a first edge tightly attached to the flat lens 1. A second edge of the reflection mirror 50 at the image source side is coincident with an object plane (i.e., a plane where the image P1 or the display screen 210 is located). A second edge of the reflection mirror 50 at the viewing side is coincident with an image plane (i.e., a plane where the floating real image P2 is located). The reflection mirror 50 at the image source side has a same height as that of the display screen 210. The reflection mirror 50 at the viewing side has a same height as that of the floating real image P2. A third edge of the reflection mirror 50 at the image source side is formed by a connection line from an edge of the flat lens 1 to an equal-level position of the display screen 210. A third edge of the reflection mirror 50 at the viewing side is formed by a connection line from the edge of the flat lens 1 to an equal-level position of the floating real image P2.

In Embodiment 1, a principle of expanding the field of view is illustrated in FIG. 11. At the image source side, light from an edge of a viewing angle that may not enter the flat lens 1 is reflected by the first augmented-vision reflection surfaces 5s-1 located at the left and right sides of the flat lens 1 and then reused, to enter the flat lens 1. After being emitted, the light is reflected by the first augmented-vision reflection surfaces 5s-1 located at the left and right sides of the flat lens 1 at the viewing side, and ultimately presents on the image plane. The two groups of reflection mirrors 50 are vertically placed. In this way, an angle $\alpha$ between the first augmented-vision reflection surface 5s-1 and the flat lens 1 is equal to 90 degrees. $\eta$ is a viewing angle without the presence of the reflection mirror 50, and $\beta$ is a range of an increased field of view on the left side, which is similarly for the right side. An actually-increased field of view approximates 180°-$\eta$. The extent of an increase in the horizontal field of view is affected by the divergence angle of the light source of the display 200 instead of parameters such as the size of the flat lens 1, the size of the display 200, and a distance between the display 200 and the flat lens 1.

According to the solution of Embodiment 1, through the above arrangements, the horizontal field of view of the floating real image P2 is the same as a horizontal field of view of the display 200. When the divergence angle of the light source of the display screen 210 is 180 degrees, the horizontal field of view of the floating real image P2 is also about 180 degrees.

Embodiment 2

FIG. 12 and FIG. 13 show a structural sketch of a display apparatus 1000 and a schematic principle diagram for expanding a horizontal field of view in Embodiment 2, and the display apparatus 1000 is a second display apparatus 1000B.

The second display apparatus 1000B includes a display 200, four reflection mirrors 50, and a flat lens 1. As illustrated in FIG. 12, a structural layout of the second display apparatus 1000B in Embodiment 2 is basically the same as a structural layout of the first display apparatus 1000A in Embodiment 1, and details are omitted herein.

$\alpha$ is the angle between the first augmented-vision reflection surface 5s-1 and the flat lens 1. Different from Embodiment 1, in Embodiment 2, the angle $\alpha$ between the first augmented-vision reflection surface 5s-1 and the flat lens 1 is an acute angle, i.e., greater than 0 degrees and smaller than 90 degrees. $\eta$ is the viewing angle without the presence of the reflection mirror 50. $\beta$ is the range of the increased field of view on the left side, which is similarly for the right side. The actually-increased field of view approximates 180°-$\eta$. The extent of the increase in the horizontal field of view is affected by the divergence angle of the light source of the display 200. According to the solution of Embodiment 2, through the above arrangement, the horizontal field of view of the floating real image P2 is the same as the horizontal field of view of the display 200. When the divergence angle of the light source of the display screen 210 is 180 degrees, the horizontal field of view of the floating real image P2 is also approximately 180 degrees.

In summary, for both Embodiment 1 and Embodiment 2, the first display apparatus 1000A and the second display apparatus 1000B can each increase the horizontal viewing angle to 180 degrees, which has a basically same increasing effect on the field of view, and neither will cause distortion of the floating real image P2. Two kinds of display apparatuses 1000 limit the size of the display 200. The reflection mirror 50 in the second display apparatus 1000B is inclined inwards, thereby imposing greater constraints on the size of the display 200. The size of the display 200 should not exceed a distance between apex angles of left and right reflection mirrors 50.

In addition, in Embodiment 2, all the reflection mirrors 50 need to be inclined. Errors are more likely to occur in an inclination angle of the reflection mirrors 50 when they are inclined. Moreover, imaging misalignment is likely to occur when the inclination angles of the two reflection mirrors 50 in the same pair are unequal. Relatively speaking, when the reflection mirrors 50 are vertically placed, the angle $\alpha$ is easy to control. Therefore, compared with Embodiment 1, the solution in Embodiment 1 is easier to implement, and the imaging quality is easily ensured.

Embodiment 3

Figure 14:
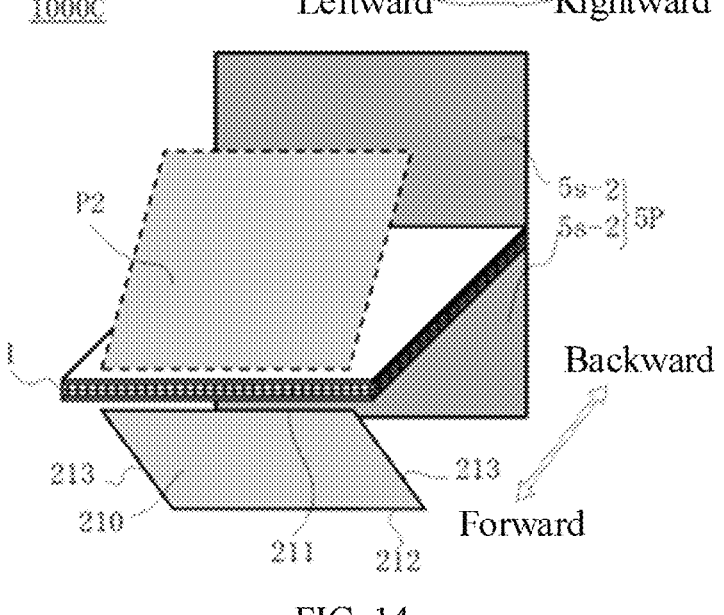
FIG. 14 is a schematic structural view of a third display apparatus in Embodiment 3 of the present disclosure.
Figure 15:
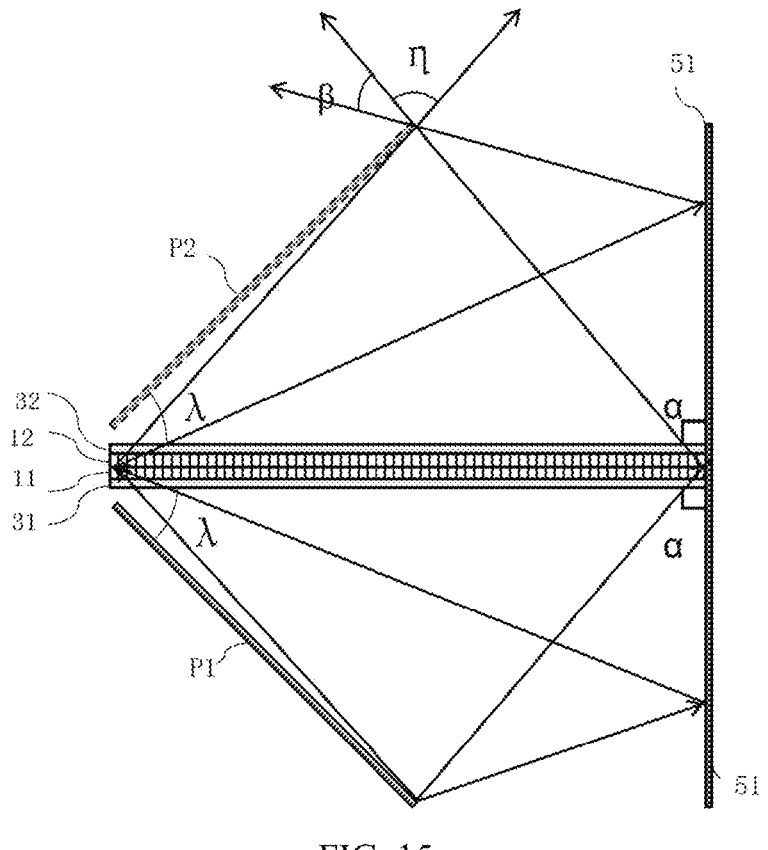
FIG. 15 is a schematic principle diagram of expanding a vertical field of view of a third display apparatus in Embodiment 3 of the present disclosure.
Figure 16:
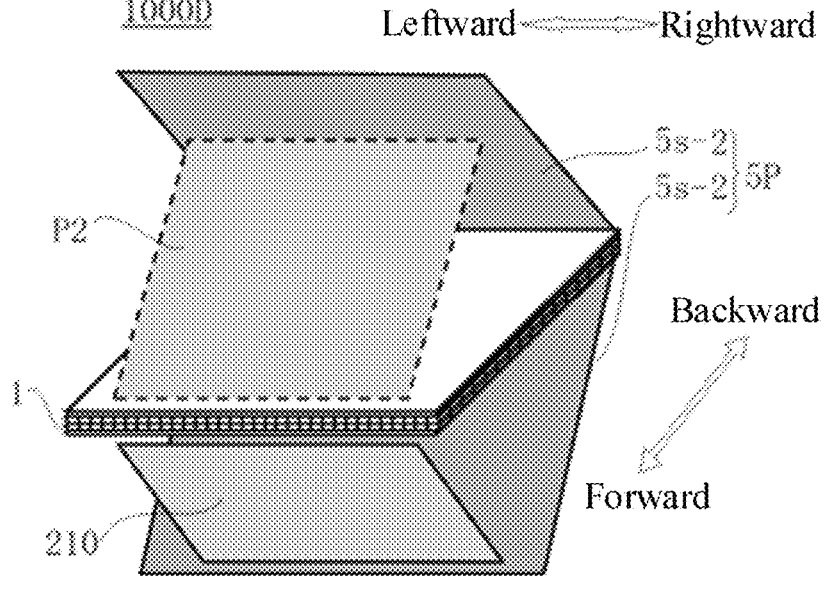
FIG. 16 is a schematic structural view of a fourth display apparatus in Embodiment 4 of the present disclosure.

FIG. 14 and FIG. 15 show a structural sketch of a display apparatus 1000 and a schematic principle diagram for expanding a vertical field of view in Embodiment 3, and the display apparatus 1000 is a third display apparatus 1000C.

The third display apparatus 1000C includes a display 200, two reflection mirrors 50, and a flat lens 1.

The display 200 is the flat panel display with the divergence angle of the light source approaching 180 degrees. In order to enhance the imaging quality of the floating real image P2, the angle $\lambda$ between the display screen 210 of the display 200 and the flat lens 1 is chosen to be 45°.

It is assumed that the proximal edge 211 of the display screen 210 is close to a front side of the flat lens 1. Therefore, the two reflection mirrors 50 are disposed at a rear side of the flat lens 1 and are located at the image source side and the viewing side, respectively.

The shape of the reflection mirror 50 is rectangular, with an edge tightly attached to the flat lens 1. Both the two reflection mirrors 50 are vertically placed and are symmetrical about the flat lens 1. The front surfaces of the two reflection mirrors 50 form the second augmented-vision reflection surface 5s-2. The two reflection mirrors 50 have the same height as that of the display 200 and the floating real image P2.

The principle of expanding the field of view in the vertical direction is illustrated in FIG. 15. α is the angle between the reflection mirror 50 and the flat lens 1, which is 90 degrees. η is the viewing angle without the presence of the reflection mirror 50. β is the range of the field of view actually increased by the third display apparatus 1000C. The vertical field of view of the floating real image P2 is jointly determined by the height of the reflection mirror 50 and the size of the flat lens 1. Since the angle λ between the display 200 and the flat lens 1 is preferably 45°, a sum of η and β is always smaller than 135°. Only when the size of the flat lens 1 tends to infinity, the sum of η and β infinitely approaches 135 degrees.

Embodiment 4

FIG. 16 to FIG. 19 show a structural sketch of a display apparatus 1000 and a schematic principle diagram for expanding a vertical field of view in Embodiment 4, and the display apparatus 1000 is a fourth display apparatus 1000D.

The fourth display apparatus 1000D includes a display 200, two reflection mirrors 50, and a flat lens 1.

Figure 17:
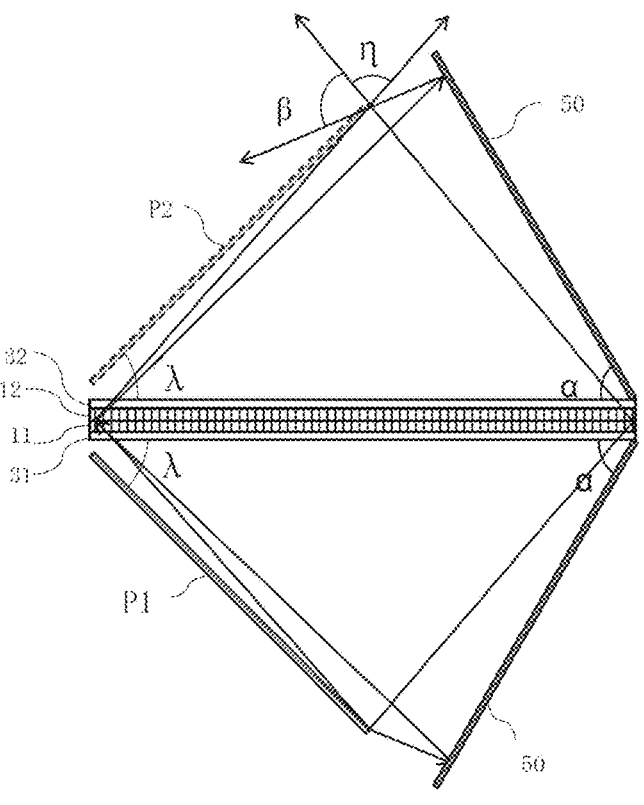
FIG. 17 is a schematic principle diagram of expanding a vertical field of view of a fourth display apparatus in Embodiment 4 of the present disclosure.

The angle between the reflection mirror 50 and the flat lens 1 is a, the reflection mirror 50 has an edge closely attached to the flat lens 1. The height of the reflection mirror 50 is slightly higher than the height of each of the display 200 and the floating real image P2. The principle of expanding the field of view in the vertical direction is illustrated in FIG. 17. In Embodiment 4, a structural layout of the fourth display apparatus 1000D is basically the same as a structural layout of the third display apparatus 1000C in Embodiment 3. A difference is that the angle α between the reflection mirror 50 and the flat lens 1 in Embodiment 4 is smaller than 90 degrees and is an acute angle.

As illustrated in FIG. 17, the light from the edge of the viewing angle of the display 200, after being reflected by the second augmented-vision reflection surface 5s-2 at the image source side, re-enters the flat lens 1. Then, the emitted light is reflected by the second augmented-vision reflection surface 5s-2 at the viewing side. In this way, an effect of increasing the field of view is achieved. η is the viewing angle without the presence of the reflection mirror 50, β is the range of a field of view actually increased by the fourth display apparatus 1000D, and γ is an angle between the reflection mirror 50 and the display 200 or the floating real image P2.

Figure 18:
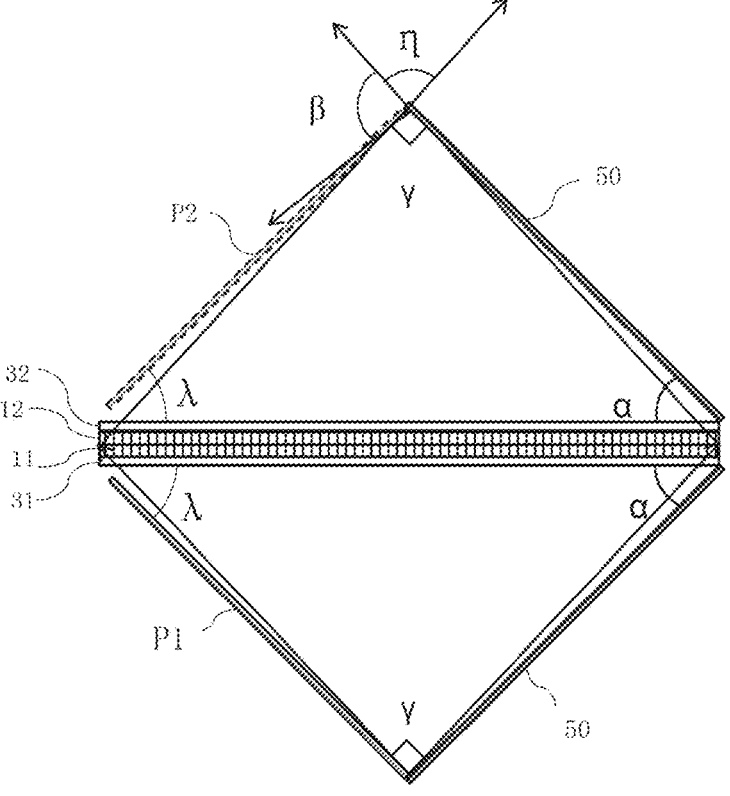
FIG. 18 is a schematic principle diagram of expanding a vertical field of view of a fourth display apparatus at $\gamma=90°$ in Embodiment 4 of the present disclosure.
Figure 19:
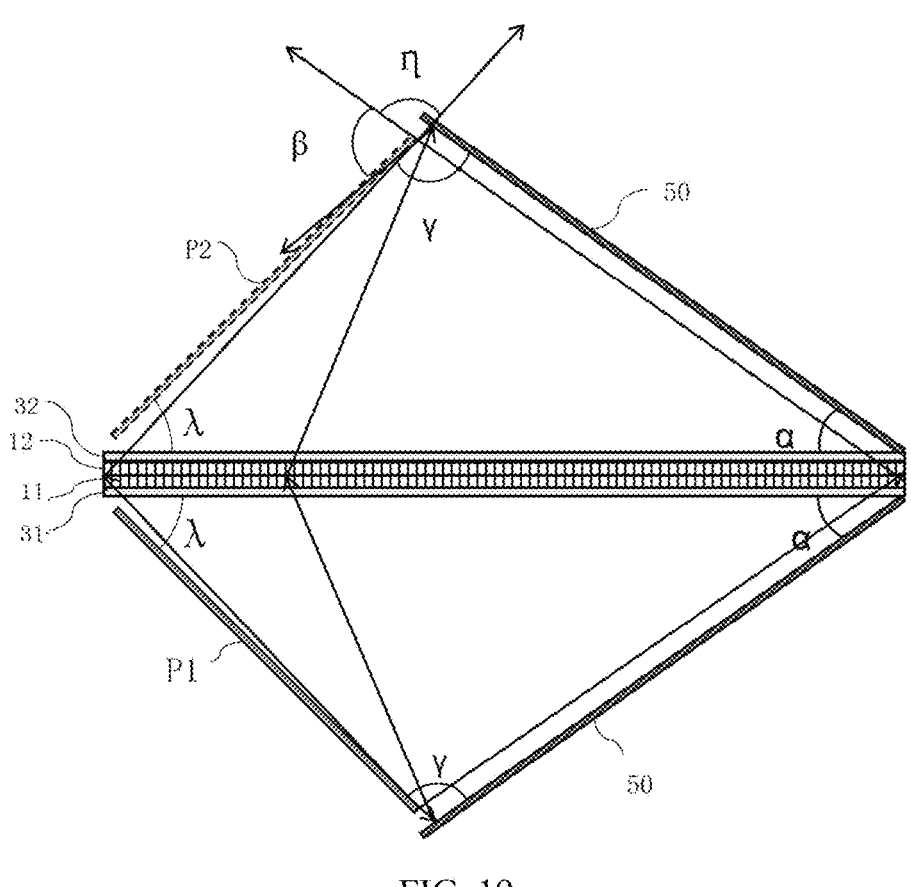
FIG. 19 is a schematic principle diagram of expanding a vertical field of view of a fourth display apparatus at $\gamma>90°$ in Embodiment 4 of the present disclosure.

FIG. 17 to FIG. 19 reveal that when other parameters are fixed, the angle α between the reflection mirror 50 and the flat lens 1 gradually decreases, allowing the angle between the reflection mirror 50 and the floating real image P2 to gradually increase. At this time, a predetermined variation in the increased field of view range β is caused.

It can be seen therefrom that only when γ is greater than or equal to 90°, the light from the edge of the viewing angle, after being reflected by the second augmented-vision reflection surface 5s-2 at the image source side, is close to the display screen 210 and enters the flat lens 1. The emitted light is reflected by the second augmented-vision reflection surface 5s-2 at the viewing side, thereby achieving the effect of enlarging the range of the field of view. The principle is illustrated in FIG. 18 when γ is equal to 90°. The principle is illustrated in FIG. 19 when γ is greater than 90°. Where γ is equal to 90°, the sum of η and β has infinitely approached 180 degrees. When γ is greater than 90°, the overall apparatus has a greater requirement for the size of the flat lens 1, but the field of view in the vertical direction can no longer be expanded.

In summary, when γ is equal to 90°, and when the angle α between the reflection mirror 50 and the flat lens 1 is 45°, the volume of the imaging apparatus is the smallest, and the vertical field of view approaches 180°.

Embodiment 5

FIG. 20 and FIG. 21 show a structural sketch of a display apparatus 1000 and a schematic principle diagram for expanding a vertical field of view in Embodiment 5, and the display apparatus 1000 is a fifth display apparatus 1000E.

The fifth display apparatus 1000E includes a display 200, four reflection mirrors 50 for increasing a horizontal viewing angle, two reflection mirrors 50 for increasing a vertical viewing angle, and a flat lens 1.

The solution of Embodiment 5 is equivalent to combining the solution of Embodiment 1 with the solution of Embodiment 4.

The display 200 is the flat panel display with the divergence angle of the light source approaching 180 degrees. In order to improve the imaging quality of the floating real image P2, the angle λ between the display 200 and the flat lens 1 is chosen to be 45°.

It is assumed that the proximal edge 211 of the display screen 210 is close to the front side of the flat lens 1. Three reflection mirrors 20 are located at the image source side, and are located at left, right, and rear sides of the flat lens 1, respectively. The three reflection mirrors 20 are located at the viewing side, and are located at the left, right, and rear sides of the flat lens 1, respectively.

The reflection mirrors 50 at the left and right sides are equal in size and symmetrical relative to the flat lens 1. The two reflection mirrors 50 at the same side are symmetrical about the central normal line L1 of the flat lens 1. The reflection mirrors 50 at the left side and the right side are both vertically placed with a triangular mirror plane. In this way, the size of the consumables and the whole apparatus can be reduced to the maximum.

The reflection mirrors 50 at the left side and the right side have a first edge tightly attached to the flat lens 1 and a second edge coincident with the object plane or the image plane. The height of the reflection mirror 50 is the same as the height of each of the display screen 210 and the floating real image P2. A third edge is composed of a connection line from the edge of the flat lens 1 to the equal-level position of each of the display screen 210 and the floating real image P2.

Reflection mirrors 50 respectively added above and below the rear side of the flat lens 1 are rectangular. The angle α between the reflection mirror 50 and the flat lens 1 is 45 degrees, the reflection mirror 50 has an edge closely attached to the flat lens 1. The height of the reflection mirror 50 is basically the same as the height of each of the display screen 210 and the floating real image P2. A side view of the structure is illustrated in FIG. 21.

The fifth display apparatus 1000E can fully reduce the volume of the apparatus by optimizing the size of the reflection mirror 50 and the angle α between the reflection mirror 50 and the flat lens 1. Moreover, the floating real image P2 can be observed within the field of view range at 180 degrees in the horizontal direction and the vertical direction.

In summary, when the display apparatus 1000 is used in public areas, a manner of expanding the field of view in a horizontal direction of the display apparatus 1000 is: adding a reflection mirror 50 at each of left and right sides of each of the display 200 and the floating real image P2. Moreover, the reflection mirrors 50 in the same pair are symmetrical to each other relative to the flat lens 1, and the reflection mirrors 50 at the same side are symmetrical to each other about the center normal line L1 of the flat lens 1. The reflection mirror 50 may be disposed obliquely inwards or disposed vertically, preferably disposed vertically, such that the flat lens 1 can be utilized to the maximum and a display 200 with a greater size may be used. The mirror plane of the reflection mirror 50 may be in a shape of a right-angled trapezoid or a triangle, with a preference for the triangle, which can reduce the size of the consumables and the entire apparatus to the maximum. The two triangular reflection mirrors 50 in each pair have a first edge tightly attached to the flat lens 1 and a second edge coincident with the object plane or the image plane (depending on whether the reflection mirror 50 is at the image source side or the viewing side). The reflection mirror 50 has the same height as that of the display 200 and the floating real image P2. The third edge is formed by the connection line from the edge of the flat lens 1 to the equal-level position of each of the display 200 and the floating real image P2.

A manner of increasing the field of view in a vertical direction of the display apparatus 1000 is as follows. The reflection mirrors 50 are respectively added above and below a side of the flat lens 1 facing away from an observer. The reflection mirrors 50 are rectangular, with an edge tightly attached to the flat lens 1, and the reflection mirrors 50 can be vertically placed or inclined inwards, with a preference for inclined inwards. Therefore, the field of view is greater, and the volume of the apparatus is smaller.

In the display apparatus 1000 for expanding the horizontal field of view, the horizontal field of view of the floating real image P2 is only related to the horizontal field of view of the display 200, and is irrelevant to the size of the flat lens 1, the size of the display 200, and the distance from the display 200 to the flat lens 1.

In the display apparatus 1000 for expanding the vertical field of view, the vertical field of view of the floating real image P2 is related to the angle between the reflection mirrors 50 and the flat lens 1, the height of the reflection mirrors 50, and the size of the flat lens 1.

In the description of the present disclosure, it is to be understood that, terms such as "center", "length", "width", "height", "thickness", "over", "below", "left", "right", "vertical", "horizontal", "top", "bottom", etc., is based on the orientation or position relationship shown in the drawings, and is only for the convenience of describing the present disclosure and simplifying the description, rather than indicating or implying that the associated apparatus or element must have a specific orientation, or be constructed and operated in a specific orientation, and therefore cannot be understood as a limitation to the present disclosure. In addition, features associated with "first" and "second" may explicitly or implicitly include one or more of these features. In the description of the present disclosure, unless otherwise specifically defined, "a plurality of" means two or more.

In the description of this specification, descriptions with reference to the terms "embodiments", "examples", etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described, it is conceivable for those of ordinary skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A display apparatus, comprising:
an imaging optical system, wherein the imaging optical system comprises:
a flat lens comprising two groups of optical waveguide arrays, each group of optical waveguide arrays being composed of a plurality of rows of sub-waveguides arranged in a single column and each having a rectangular cross section, wherein the two groups of optical waveguide arrays comprise a first optical waveguide array and a second optical waveguide array, the sub-waveguides in the first optical waveguide array extending in an X direction and being arranged in a plurality of rows in a Y direction, the sub-waveguides in the second optical waveguide array extending in the Y direction and being arranged in a plurality of rows in the X direction, the first optical waveguide array and the second optical waveguide array being arranged in a Z direction, every two of the X direction, the Y direction, and the Z direction being perpendicular to each other, the flat lens having a center normal line passing through a center of the flat lens and being parallel to the Z direction, two opposite sides of the flat lens being an image source side and a viewing side, respectively; and
a reflection assembly having at least one pair of reflection surfaces, two reflection surfaces in a same pair being located at the image source side and the viewing side, respectively, each reflection surface being planar and facing towards the center normal line, and an angle between each reflection surface and the flat lens being smaller than or equal to 90 degrees,
wherein angles between each of the two reflection surfaces in the same pair and the flat lens are equal, and intersection lines of each of the two reflection surfaces in the same pair and the flat lens are parallel to each other; and
a display located at the image source side and having a display screen facing towards the flat lens, wherein:
the display screen is a straight panel screen, an angle between the display screen and the flat lens being an acute angle, the display screen having four edges that are a proximal edge, a distal edge, and two inclined edges, respectively, the proximal edge and the distal edge being two opposite edges of the display screen, and the proximal edge being located at a side edge of the display screen that is close to the flat lens; and at the image source side, two sides of the display screen corresponding to the two inclined edges have reflection surfaces, respectively, and/or a side of the display screen corresponding to the distal edge has a reflection surface.

2. The display apparatus according to claim 1, wherein:

the reflection surface corresponding to the inclined edge is a first augmented-vision reflection surface; and a projection formed by the display screen in a direction parallel to the flat lens is completely located within the first augmented-vision reflection surface.

3. The display apparatus according to claim 2, wherein:

the first augmented-vision reflection surface is triangular or trapezoidal; and the projection formed by the display screen in the direction parallel to the flat lens is flush with an edge of the first augmented-vision reflection surface.

4. The display apparatus according to claim 2, wherein:

the reflection surface corresponding to the distal edge is a second augmented-vision reflection surface; and the second augmented-vision reflection surface is rectangular.

5. The display apparatus according to claim 4, wherein:

the first augmented-vision reflection surface is triangular;

the projection formed by the display screen in the direction parallel to the flat lens is flush with the edge of the first augmented-vision reflection surface; and a projection formed by the second augmented-vision reflection surface in the direction parallel to the flat lens is flush with another edge of the first augmented-vision reflection surface.

6. The display apparatus according to claim 1, wherein an edge of each reflection surface is attached to the flat lens.

7. The display apparatus according to claim 1, wherein the reflection assembly has a plurality of pairs of reflection surfaces arranged in directions surrounding the central normal line.

8. The display apparatus according to claim 7, wherein:

two of the plurality of pairs of reflection surfaces are located at two opposite sides of the center normal line; and in the two pairs of reflection surfaces located at the two opposite sides of the center normal line, angles between each of the two pairs of reflection surfaces and the flat lens are equal, and intersection lines of each of the two pairs of reflection surfaces and the flat lens are parallel to each other.

9. The display apparatus according to claim 1, wherein the two reflection surfaces in the same pair are symmetrically arranged relative to the flat lens.

10. The display apparatus according to claim 1, wherein:

the reflection assembly comprises at least two reflection mirrors that are plane mirrors; and a surface of each of the at least two reflection mirrors facing towards the center normal line forms the reflection surface.

* * * * *